United States Patent [19]
Lisle et al.

[11] Patent Number: 5,936,624
[45] Date of Patent: Aug. 10, 1999

[54] DATA PROCESSING SYSTEM HAVING A LOGICAL CONTAINMENT SYSTEM AND METHOD THEREFOR

[75] Inventors: Linda Arnold Lisle, Cedar Park; Shirley Lynn Martin; John Martin Mullaly, both of Austin, all of Tex.

[73] Assignee: International Business Machines Corporation, Armonk, N.Y.

[21] Appl. No.: 08/813,717

[22] Filed: Mar. 7, 1997

[51] Int. Cl.⁶ .................................................. G06F 3/14
[52] U.S. Cl. ...................... 345/348; 345/156; 345/334; 345/340; 707/2; 707/3; 707/102
[58] Field of Search ................................ 345/348, 334, 345/156, 340; 707/102, 2, 3

[56] References Cited

U.S. PATENT DOCUMENTS

| | | | |
|---|---|---|---|
| 4,899,136 | 2/1990 | Beard et al. | 345/156 |
| 4,939,507 | 7/1990 | Beard et al. | 345/156 |
| 5,060,135 | 10/1991 | Levine et al. | 345/351 |
| 5,113,517 | 5/1992 | Beard et al. | 395/500 |
| 5,261,044 | 11/1993 | Dev et al. | 345/357 |
| 5,276,785 | 1/1994 | Mackinlay et al. | 345/427 |
| 5,479,603 | 12/1995 | Stone et al. | 345/326 |
| 5,491,781 | 2/1996 | Gasperina | 345/341 |
| 5,524,199 | 6/1996 | Orton et al. | 345/340 |
| 5,544,302 | 8/1996 | Nguyen | 345/156 |
| 5,559,948 | 9/1996 | Bloomfield et al. | 345/335 |
| 5,561,753 | 10/1996 | Coulombe et al. | 345/326 |
| 5,602,996 | 2/1997 | Powers, III et al. | 345/344 |
| 5,619,637 | 4/1997 | Henshaw et al. | 345/348 |
| 5,621,878 | 4/1997 | Owens et al. | 345/326 |
| 5,673,403 | 9/1997 | Brown et al. | 345/335 |
| 5,737,557 | 4/1998 | Sullivan | 345/348 |
| 5,745,111 | 4/1998 | Cline et al. | 345/348 |

OTHER PUBLICATIONS

R. Cowart, "Mastering Windows 3.1", SYBEX, pp. 73–96, 1992.
Burge, Thomas E., et al. "PM's Window Hierarchy," *Advanced OS/2™ Presentation Manager Programming*, John Wiley & Sons, Inc., New York, NY, pp. 37–38.
*Microsoft® OS/2 Programmer's Reference*, vol. 1, Microsoft Press, 1989, pp. 64, 71, 112, 119, 120.
Muller, Nathan, "Dial 1–800–Internet," *Byte*, Feb., 1996, pp. 83–88.
*Object–Oriented Interface Design: IBM Common User Access™ Guidelines*, Que Corporation, 1st Ed. (Dec. 1992), pp. 43–45, 55–57, 235, 329, 342, 497 and 654.
Wayner, Peter, "Hey Baby, Call Me at My IP Address," *Byte*, Apr., 1996, pp. 142–144.
*The Windows™ Interface: An Application Design Guide*, Microsoft Press, 1992, pp. 126–127.

*Primary Examiner*—Paul V. Kulik
*Assistant Examiner*—Jean R. Homere
*Attorney, Agent, or Firm*—Winstead Sechrest & Minick P.C.; Anthony V. S. England

[57] ABSTRACT

A data processing system, software program and method effectively and intuitively display a storage space of a data processing system to an end-user to allow the end-user to create a filing system which has an easily usable interface. In implementing this methodology, the user is allowed to simply request that all objects within an entire file system of a data processing system be placed in a logical container. A user sets the parameters for defining the desired characteristics of each of the objects stored within the logical container. Thus, a user is able to organize representations of desired objects in various storage locations without requiring extra steps by a user or excess memory. Furthermore, the contents of a logical container are dynamically updated in real-time to ensure that the filed information is current and accurate. The ability of a user to modify the containment settings and to have such modifications immediately reflected in the logical container rendered on a display device allows a user great flexibility in obtaining a desired graphical user interface.

21 Claims, 10 Drawing Sheets

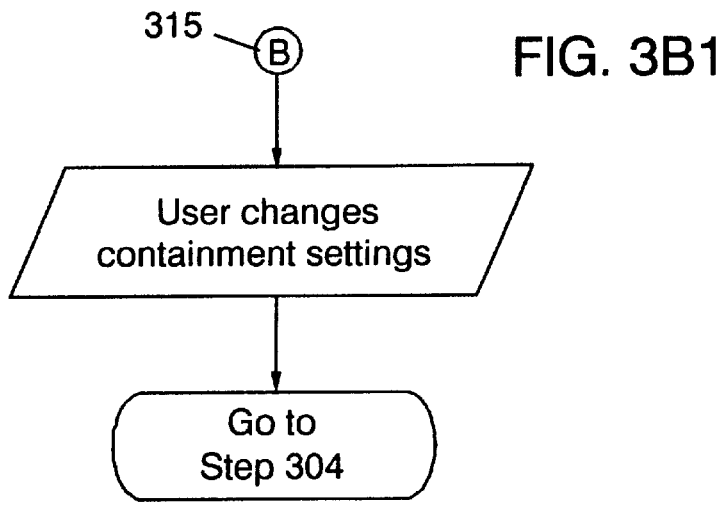
FIG. 3B1
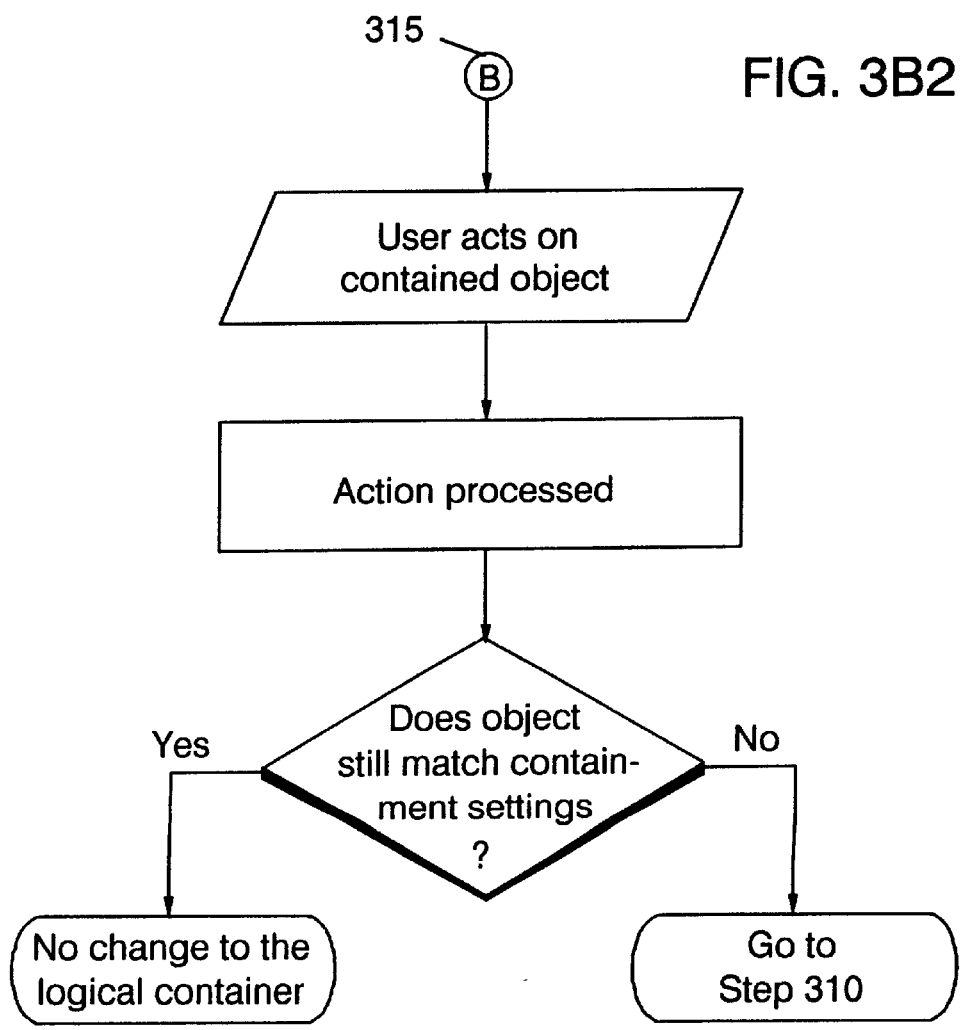
FIG. 3B2

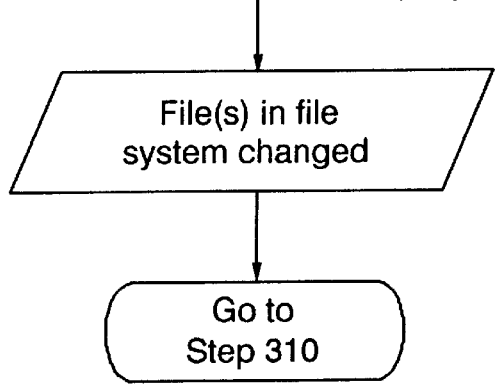
FIG. 3B3
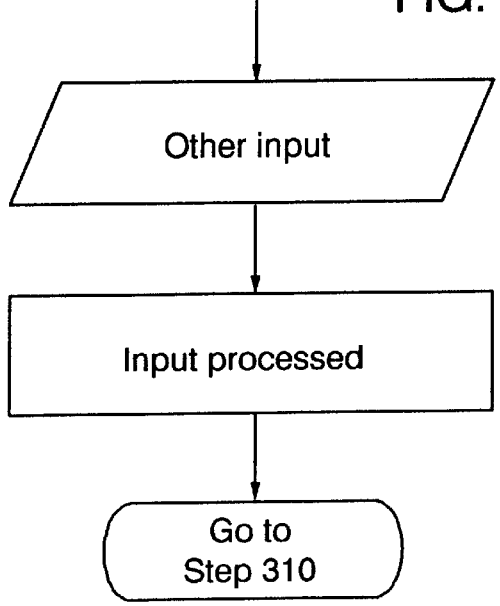
FIG. 3B4
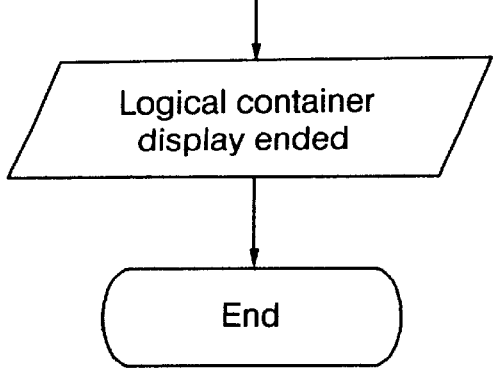
FIG. 3B5

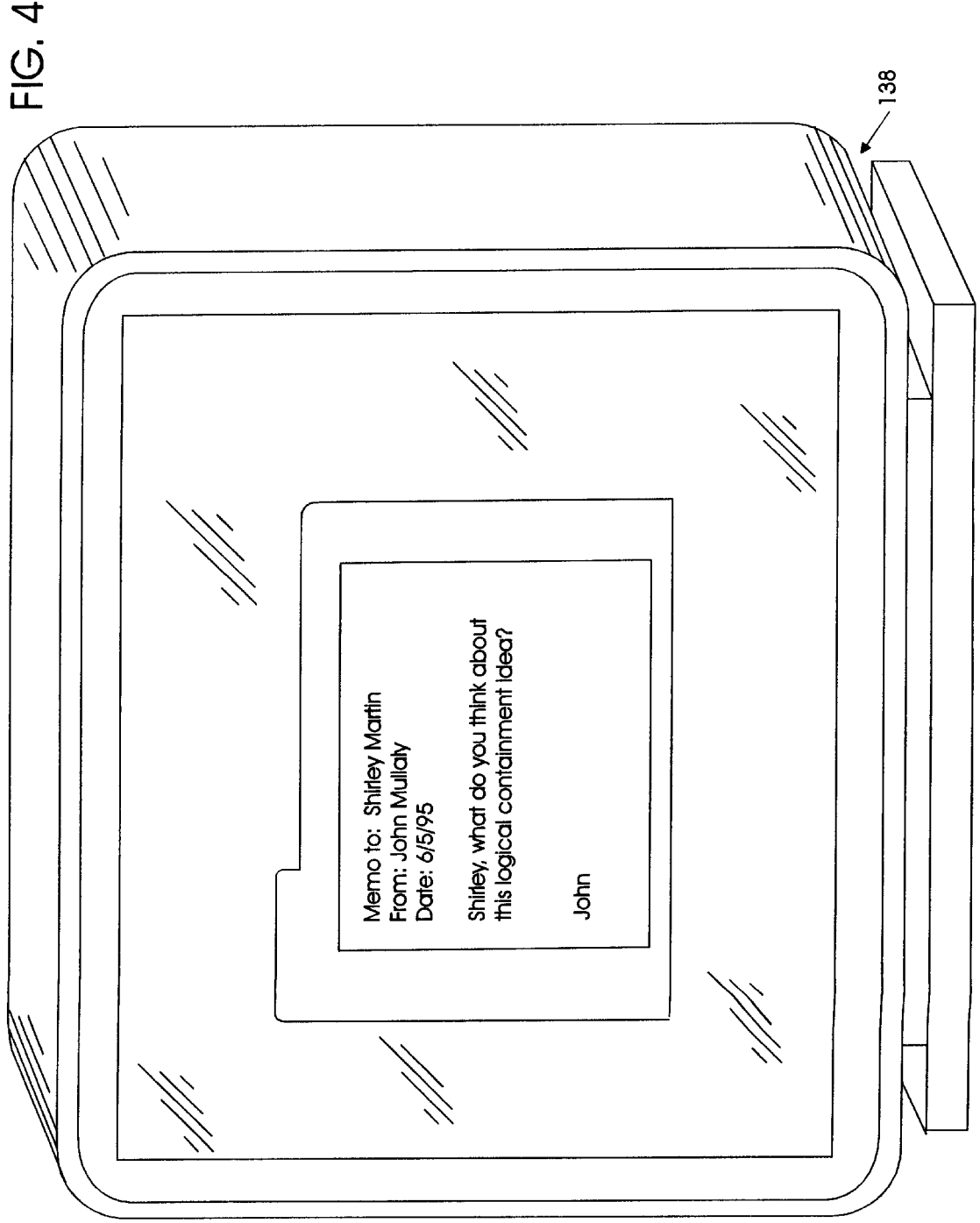

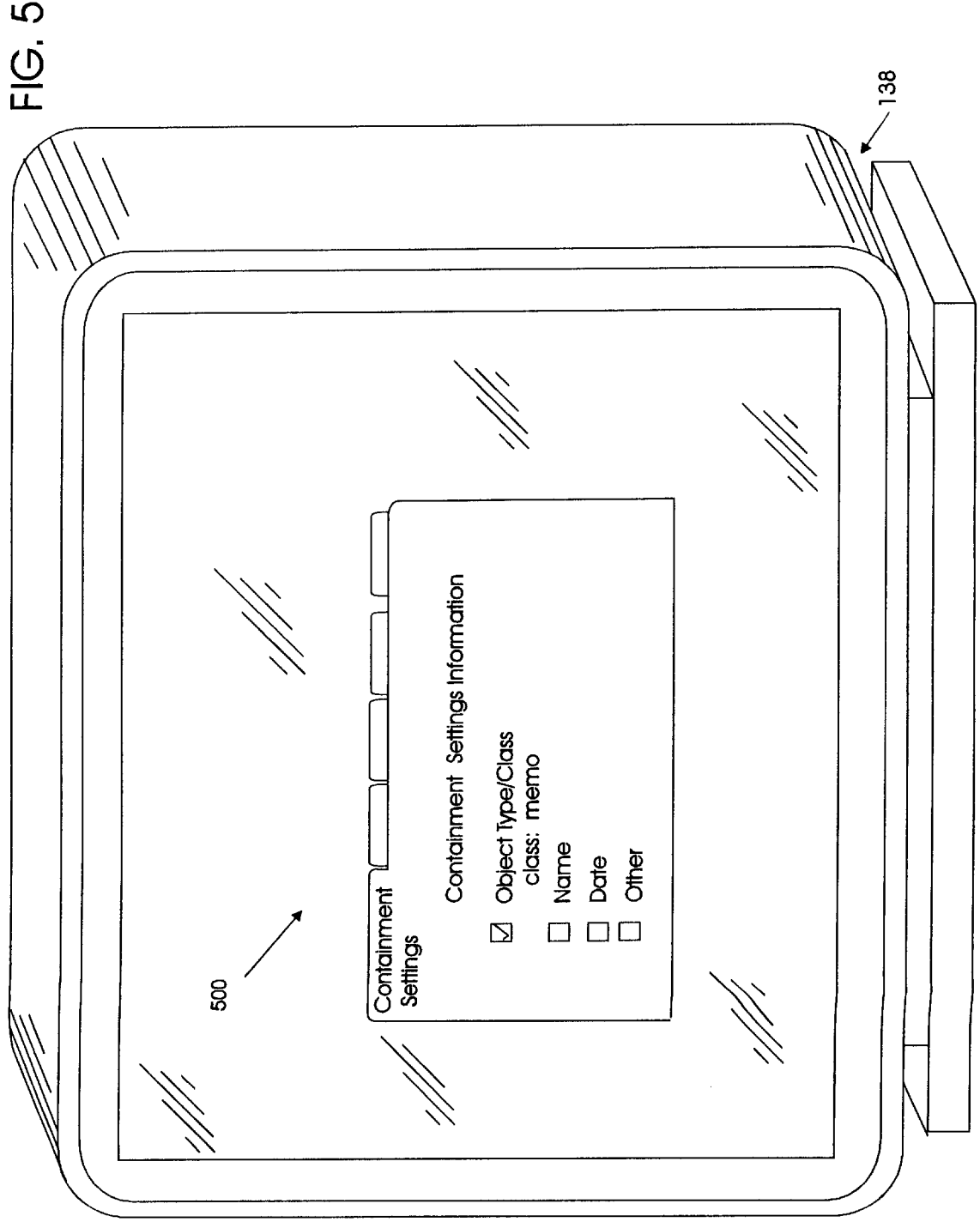

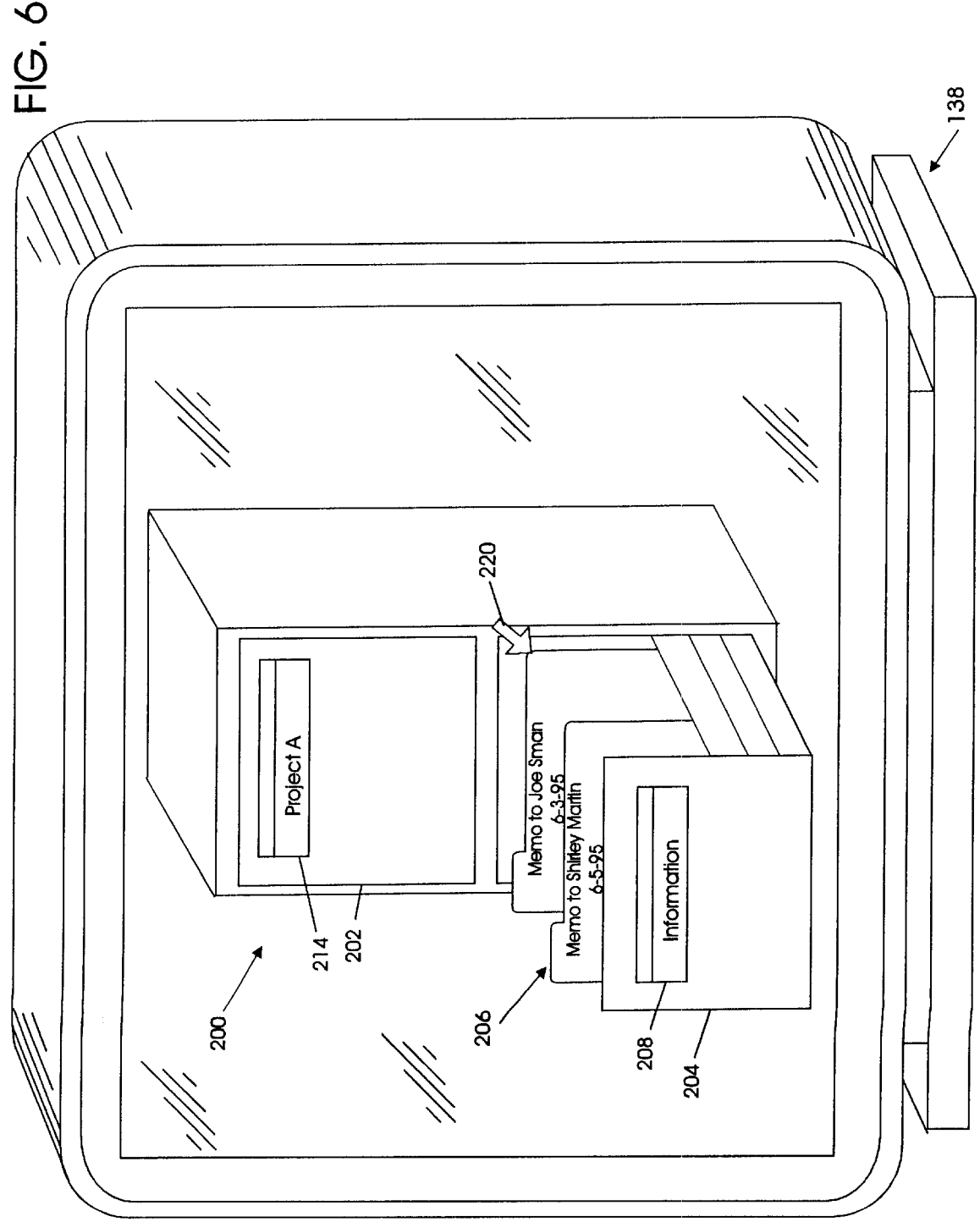

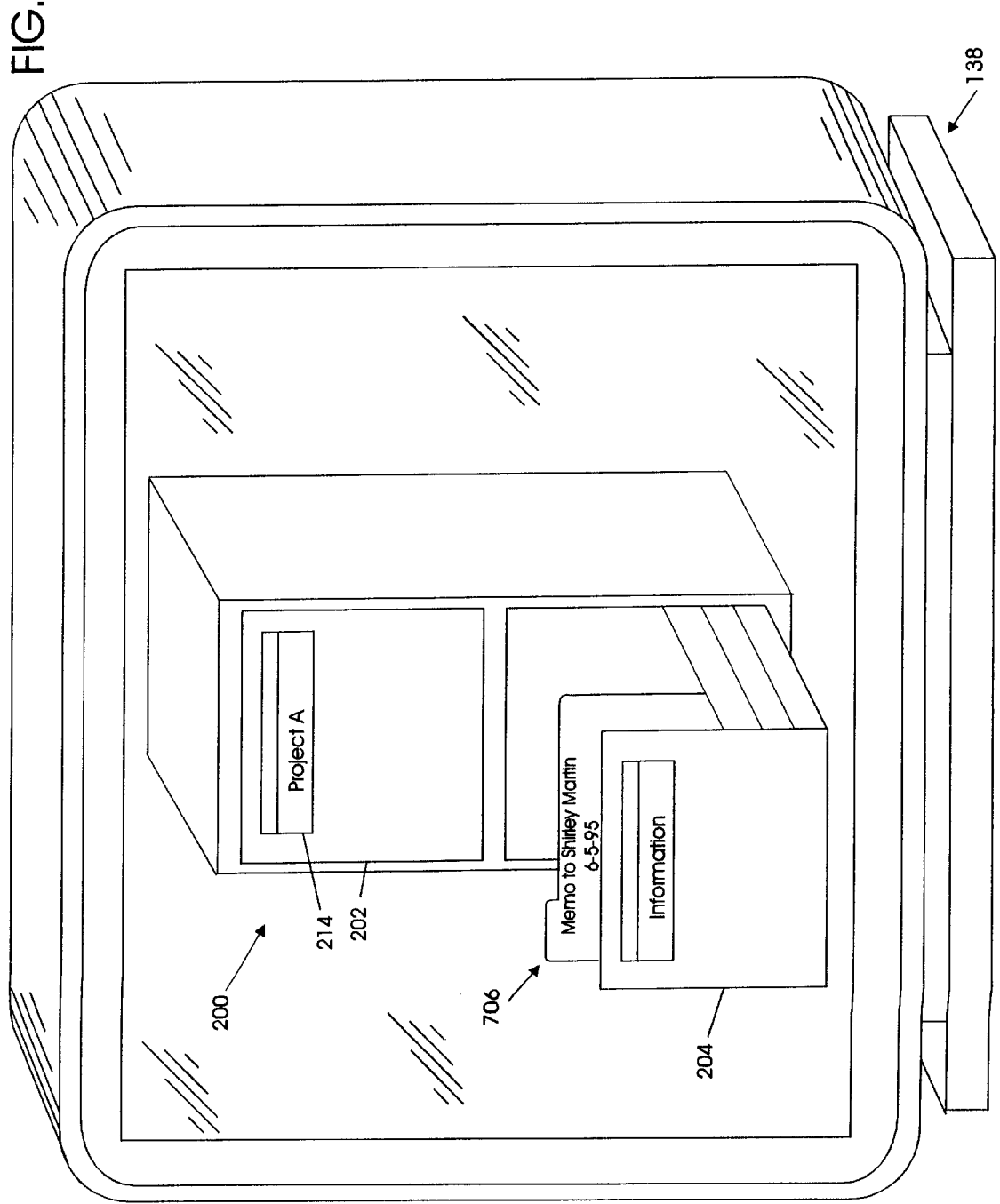

ic user interface, and in particular, to a graphical user interface which provides a logical containment system for a storage space in a data processing system.

DATA PROCESSING SYSTEM HAVING A LOGICAL CONTAINMENT SYSTEM AND METHOD THEREFOR

CROSS-REFERENCE TO RELATED APPLICATIONS

The present application is related to the following applications:

Ser. No. 08/753,081, entitled "CREATING REAL-WORLD OBJECTS", filed on Nov. 20, 1996.

Ser. No. 08/753,082, entitled "DATA PROCESSING SYSTEM AND METHOD FOR CONTROLLING A VIEW OF A REALISTIC OBJECT IN A DISPLAY DEVICE", filed on Nov. 20, 1996.

Ser. No. 08/753,077, entitled "PRIORITIZATION OF BACKGROUND DISPLAY DURING ANIMATION", filed on Nov. 20, 1996.

Ser. No. 08/753,122, entitled "MULTIFUNCTIONAL OBJECT", filed on Nov. 20, 1996.

Ser. No. 08/753,076, entitled "SYSTEM AND METHOD FOR MAINTAINING SIZE AND POSITION RELATIONSHIPS FOR NON-RECTANGULAR REAL-WORLD OBJECTS", filed on Nov. 20, 1996.

Ser. No. 08/753,124, entitled "DATA PROCESSING SYSTEM AND METHOD FOR SCALING A REALISTIC OBJECT ON A USER INTERFACE", filed on Nov. 20, 1996.

Ser. No. 08/753,078, entitled "DATA PROCESSING SYSTEM AND METHOD FOR VIEWING OBJECTS ON A USER INTERFACE", filed on Nov. 20, 1996.

Ser. No. 08/753,079, entitled "DATA PROCESSING SYSTEM AND METHOD FOR PERFORMING AUTOMATIC ACTIONS IN A GRAPHICAL USER INTERFACE", filed on Nov. 20, 1996.

Ser. No. 08/753,123, entitled "DATA PROCESSING SYSTEM AND METHOD FOR MODIFYING A SIZE OF A REALISTIC OBJECT ON A USER INTERFACE", filed on Nov. 20, 1996.

Ser. No. 08/789,030, entitled "DATA PROCESSING SYSTEM AND METHOD FOR SIMULATING COMPOUND OBJECTS", filed on Jan. 27, 1997.

All of the above applications were filed on Nov. 20, 1996, except for the latter (U.S. Ser. No. 08/789,030), which was filed on Jan. 27, 1997, and all are assigned to the assignee of the present application.

The present patent application is also related to the following applications:

Ser. No. 08/813,718, entitled "DATA PROCESSING SYSTEM AND METHOD FOR IMPLEMENTING AN INFORMATIVE CONTAINER FOR A FILE SYSTEM", filed on Mar. 7, 1997; and Ser. No. 08/817,754, entitled "DATA PROCESSING SYSTEM AND METHOD FOR PERFORMING CONTAINER LEVEL ACTIONS", filed on Mar. 7, 1997.

wherein the above two applications have been assigned to the assignee of the present application and are being filed concurrently herewith.

TECHNICAL FIELD

The present invention relates in general to a graphical user interface, and in particular, to a graphical user interface which provides a logical containment system for a storage space in a data processing system.

BACKGROUND INFORMATION

As computers have developed to provide greater capabilities at greater speeds, the techniques for interacting with computers have also become much simpler. For example, icons provide pictorial representations of functions which may be executed by a computer and allow a user to easily access a function with the simple click of a mouse or stroke of a keyboard key. While icons provide an understandable interface, icons still require the user to perform the step of opening a window before additional information may be gained or functions may be performed. Furthermore, while icons provide pictorial representations of an application or even a memory sub-system, such as a disk drive, an icon is not able to provide additional information about the contents of the object with which it corresponds. To access such information, an external user must open a window corresponding to the icon and pull down a menu which allows for an eventual disclosure of the information.

In addition to icons, many current software programs use realistic representations of objects to take advantage of a user's experience with the physical world. Therefore, rather than present the user with a series of panels and window frames or pull-down menus, a software program for implementing an application may present a realistically-rendered object which is placed directly on a desktop or other environment. While such realistic representations enable a user to more easily interface with a computer, the applications which implement the realistically-rendered objects are limited by the protocols required by a development system in which the object is implemented. These limitations are especially apparent in filing systems in current operating systems.

In current operating systems, filing systems are typically implemented as a desk-top model based on an interface and a file system structure. Generally, the file system structure is mapped to that of the graphical environment in a direct manner. Stated another way, the storage structure of the graphical user interface is, for the most part, the same as that of the file system. For example, storage structures in the Windows '95 operating system developed by Microsoft are stored in folders which correspond to a directory structure of the file system. In the filing system in this operating system, as well as the real world, an object must exist somewhere and can only exist in one place. Such a construction limits a user's actions as they are forced to store objects in a single place and are not able to store them in multiple containers.

In an attempt to overcome the limitations discussed above, the Windows '95 operating system implemented a "shortcut" function. Shortcut functions allow a user to create a representation, but not a copy, of an object to another storage space. While such functions are useful, the user is forced to manually move the object to each desired storage space. Such manual movements can be time consuming and may result in inaccuracies in the filing system, especially when a user desires to consolidate a large number of objects in a single space and the objects are scattered across many data structures. When using the shortcut functions of Windows '95, the user is forced to open each data structure and access the desired folders or files individually. Furthermore, a user's actions on the representation which is created by the shortcut function is confined to the representation. For example, a delete action will be performed only on the representation, and not on the object itself. Other examples of operations which perform functions similar to the "shortcut" functions of Windows '95 is the alias function in a Macintosh operating system and a "shadow" function in an OS/2 operating system. It should be noted that if a source file is moved, the link, shortcut, alias, and shadow functions will no longer allow a user to access a desired file.

In a similar vein, Lotus Notes, manufactured by Borland, allows a user to selectively categorize mail messages in a single container. After a categorization operation, a user is then able to view only a selected category. While the Lotus Notes application provides the ability of a user to categorize mail into desired categories which are not necessarily dependent on a data structure of the operating system in which it is implemented, the Lotus Notes application is limited to categorizing contents within a single container. Furthermore, each object must be categorized independently for each object is limited by a type of categories which may be otherwise established automatically.

While current data processing applications have recognized a need for greater flexibility in filing system structures, the solutions which have been developed are problematic for many reasons. Each of the systems described above still requires a user to function within the constraints of an operating system which limits a manner in which data may be stored in a filing system and a manner in which categorization may be performed. As the file systems described above have many constraints which limit a user's actions, require extraneous actions, or increase a memory load of the user, it is apparent that there is a need for a more flexible filing system in a graphical user interface of a data processing system.

SUMMARY OF THE INVENTION

The previously mentioned needs are fulfilled with the present invention. Accordingly, there is provided, in a first form, a data processing system. The data processing system includes a user interface for receiving a first plurality of control signals indicating a first object type. The data processing system also includes a memory system for storing the plurality of stored objects. A central processing unit is connected to the user interface for receiving the first plurality of control signals. The central processing unit is connected to the memory system. The central processing unit queries the memory system to identify a first portion of the plurality of stored objects which are the first object type in response to the first plurality of control signals. The central processing unit generates a first plurality of representations of the first portion of the plurality of stored objects.

Additionally, there is provided, in a second form, a method for operating a data processing system. The method includes the steps of receiving a first plurality of control signals from a user interface. The first plurality of control signals corresponds to a first object type. The method also includes the step of querying a memory system to access a first plurality of stored objects. Each of the first plurality of stored objects if the first object type. The method also includes the step of generating a first plurality of representations corresponding to each of the first plurality of stored objects.

Furthermore, there is provided, in a third form, a program storage device readable by a machine, tangibly embodying a program of instructions executable by the machine to perform method steps for simulating an object in a data processing system. The method steps include receiving a first plurality of control signals from a user interface. The first plurality of control signals corresponds to a first object type. The method also includes the step of querying a memory system to access a first plurality of stored objects.

Each of the first plurality of stored objects is the first object type. The method also includes the step of generating a first plurality of representations corresponding to each of the first plurality of stored objects.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3-B-1 illustrates, in flow diagram form, a portion of the methodology of FIG. 3-A;

FIG. 3-B-2 illustrates, in flow diagram form, a portion of the methodology of FIG. 3-A;

FIG. 3-B-3 illustrates, in flow diagram form, a portion of the methodology of FIG. 3-A;

FIG. 3-B-4 illustrates, in flow diagram form, a portion of the methodology of FIG. 3-A;

FIG. 3-B-5 illustrates, in flow diagram form, a portion of the methodology of FIG. 3-A;

FIG. 4 illustrates, in block diagram form, a display device in accordance with one embodiment of the present invention;

FIG. 5 illustrates, in block diagram form, a display device in accordance with one embodiment of the present invention;

FIG. 6 illustrates, in block diagram form, a display device in accordance with one embodiment of the present invention;

FIG. 7 illustrates, in block diagram form, a display device in accordance with one embodiment of the present invention.

DETAILED DESCRIPTION

Figure 1:
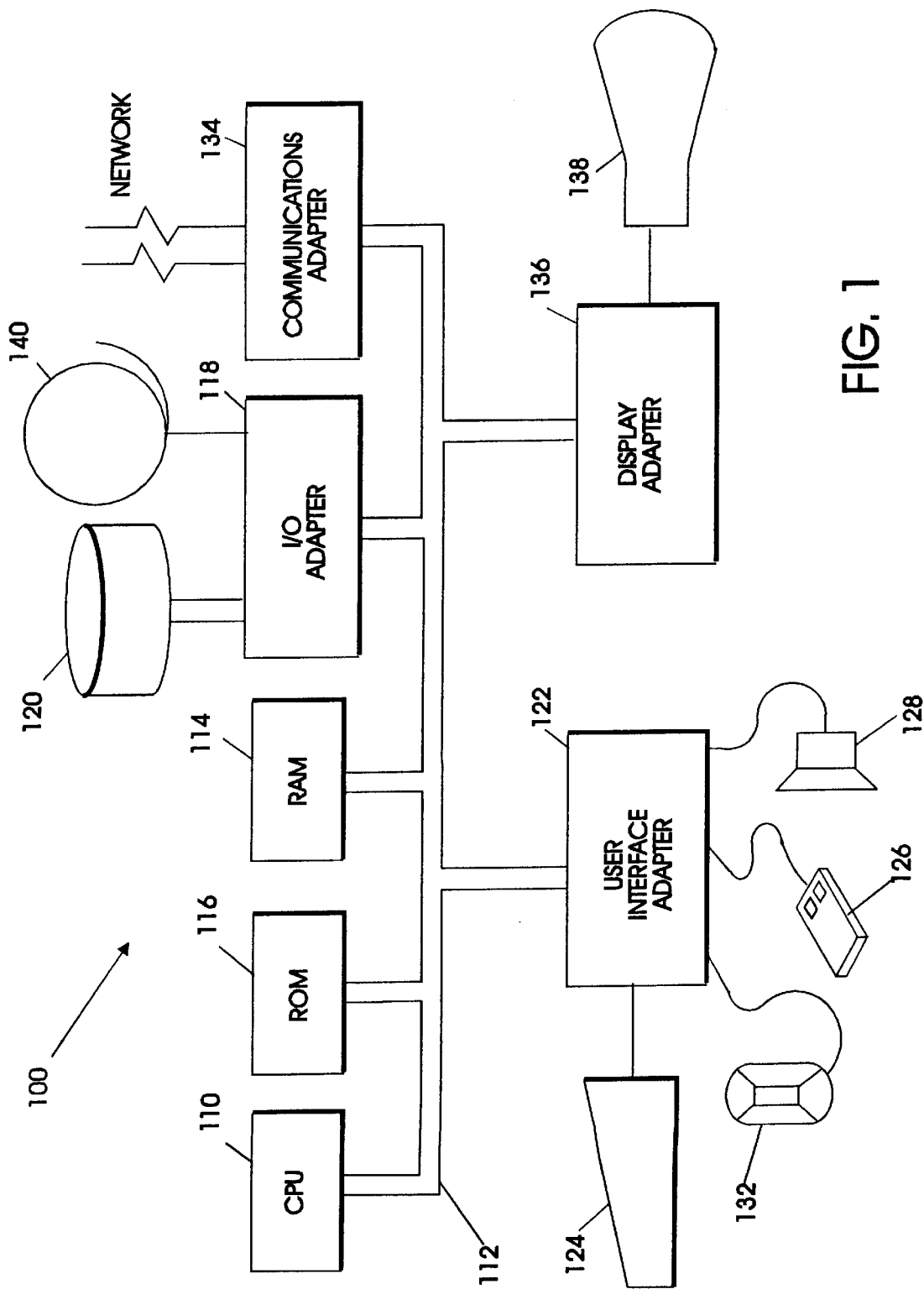
FIG. 1 illustrates, in block diagram form, a data processing system in accordance with one embodiment of the present invention.

The present invention provides a data processing system, software program and method for operating each, which implements a filing system for organizing objects in a graphical user interface for a storage space of a data processor. This invention may be utilized in currently available graphical user interfaces or with real-world style interfaces to provide a filing system interface which is easily accessible and intuitive to use. In addition to providing an easily understandable interface, the filing system of the present invention provides capabilities which are not available in real-world filing systems. Therefore, the present invention effectively provides the best of both the real-world and the virtual world of computer systems. Operation of the filing system of the present invention will generally be described below and a more detailed description will subsequently follow.

In the filing system of the present invention, a display device renders an object which represents access to the filing system of a data processing system. The displayed object may be a filing cabinet or any other device which may be used for storage. Assume in the following text that the displayed object is a filing cabinet. It should be noted, however, that additional configurations may be developed by a designer of the graphical user interface. In accessing the filing system of the data processing system, the filing cabinet is a logical container which is able to hold a collection of objects. The objects stored within the logical container are determined by property settings of the logical containers. For example, consider a logical container which has a property setting that which specifies that it contains all document files (or all objects categorized as "documents"). In the present invention, this logical container will include all document files that exist in the data processing system. Representations of any documents or objects categorized as documents which are created at a later point in time, regardless of any other container in which they may reside and regardless of their location in the physical storage system, are automatically included in the logical container.

As alluded to above, the present invention provides a user interface mechanism which represents a computer container and allows a user to classify the contents of the container in a manner desired by an external user. The logical containment system of the present invention does not simply organize objects for a single or particular storage space. Rather, the present invention categorizes and classifies objects that are obtained from a broader file system which may include a network, a disk drive, or even the world-wide web. Additionally, the logical container of the present invention provides "smart" containers which allow a user to simply specify categories of objects that the container will store or include as a representation. During operation, the objects are then located automatically from the broader file system described above and representatives of those objects are stored in the logical container. Therefore, a user simply specifies the type of objects to be contained by a logical container and the logical container of the present invention automatically presents all objects of said type as contents of the logical container. In addition to identifying a group of desired files, the user is able to perform actions on these files such as a delete action, a move action, a copy action, an archive action, a link action, and an undue action, among others. The implementation of such "smart" logical containers allows a user to more efficiently and effectively interface with the computer system. For example, rather than having to consolidate desired documents manually using manual search and move operations or being required to save certain documents in a specified storage space as is required by prior art systems, the present invention allows a user to easily organize information and display that information in an intuitive and easily accessible manner.

Furthermore, the logical container of the present invention allows a user to access "representations" of the object in several different files or logical containers, while allowing the object to remain in only one original physical storage space. By using this methodology, a user is able to effectively access an object from multiple files with which the object may be associated, but additional memory is not required to replicate the object in each of the physical storage spaces corresponding to those logical containers.

In addition to providing an effective and intuitive interface for accessing desired objects, the logical container of the present invention allows a user to specify information about the objects to be stored within the logical container in a useful way. The present invention allows the user to establish criteria for the information to be used to identify desired objects and then automatically update the contents of a logical container when the objects within the storage space are modified in some manner. The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numerals through the several views.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
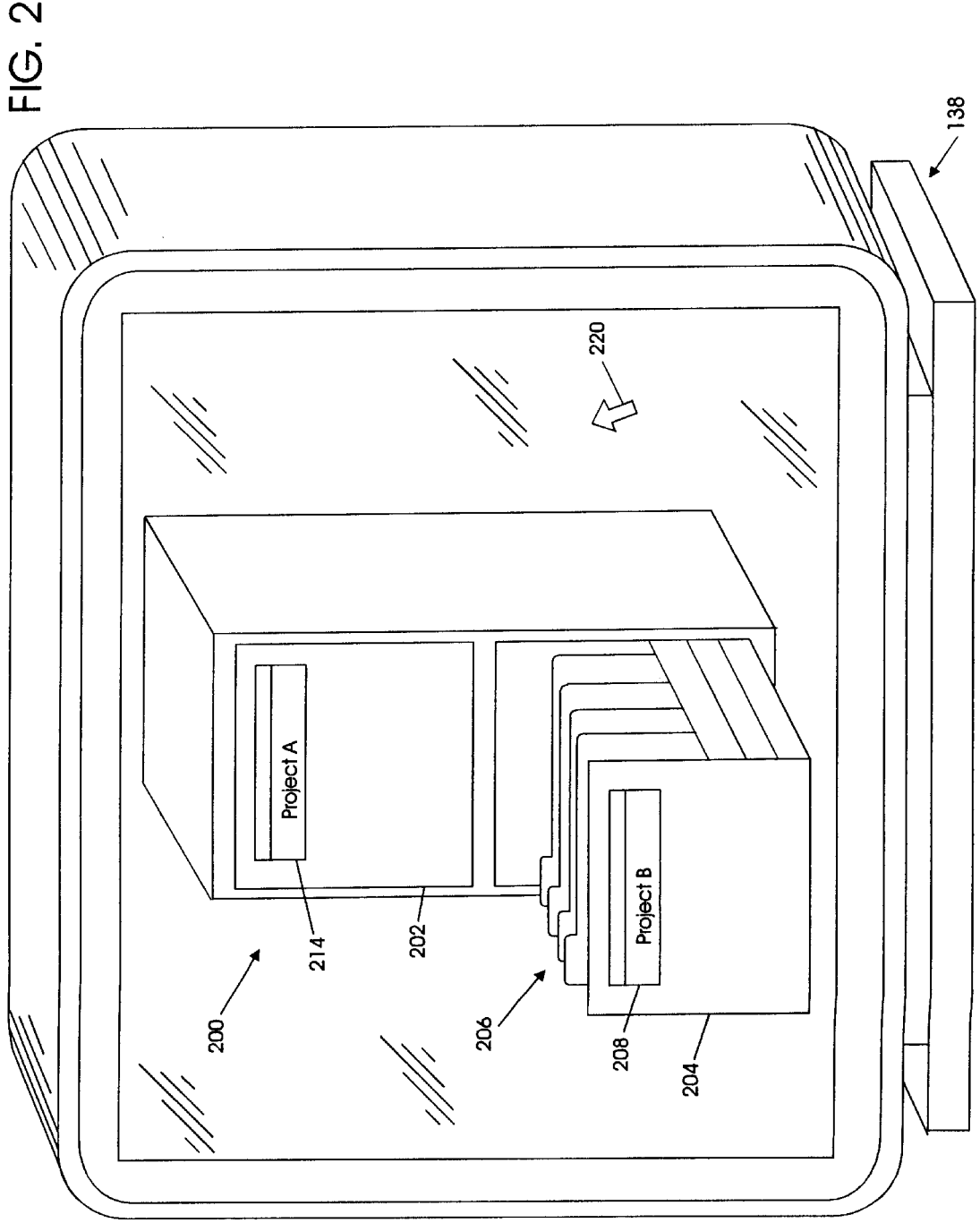
FIG. 2 illustrates, in block diagram form, a display device in accordance with one embodiment of the present invention.

Referring to FIG. 2, display device 138 and an object illustrated thereon are provided. It should be noted that the objects illustrated on display device 138 are determined by a remaining portion of data processing system 100. For example, CPU 110 controls the data communicated between display adapter 136 and both ROM 116 and RAM 114 to determine when an object is to be displayed on display device 138. In display device 138 of the present invention, a filing system window which illustrates a filing cabinet 200 as a real-world metaphor of storage space in data processing system 100 is provided. Filing cabinet 200 comprises two drawers 202 and 204. In one embodiment of the present invention, each of drawers 202 and 204 may be used to represent a disk drive, a server, a data base, a partition, equivalent of a directory, or any portion of a storage space designated by a user. However, it should be understood that each of drawers 202 and 204 is not intended to represent a specified storage space which mirrors a data structure. For example, drawer 202 may represent a logical container for all objects related to a first project A, as indicated in label 214 of drawer 202. In collecting each of the objects to be stored within drawer 202, data processing system 100 accesses a broad network associated with data processing system 100 to access every object related to project A. Therefore, drawer 202 may obtain objects retrieved from disk drive 120, RAM 114, and possibly even another database to which data processing system 100 is connected using communications adapter 134. In the example illustrated herein, it should be noted that label 214 of drawer 202 may be used to indicate information desired by a user and is not required to correspond to a given data structure. For example, a user may select a label 214 which indicates a data range for objects stored therein or a label 214 which indicates a content type of the objects, rather audio, text, video, or another application, stored in drawer 202.

It should be noted that in the embodiment of the invention illustrated in FIG. 2, drawer 202 is in a closed position, while drawer 204 is in an open position. As drawer 204 is in an open position, a plurality of folders 206 is illustrated therein. Each of the plurality of folders 206 represents an object which matches the containment settings of drawer 204 and is, therefore, stored in the storage space associated with drawer 204. As previously mentioned, the categorizations of these objects may be specified by a user through a containment setting page displayed on display device 138, but not illustrated in FIG. 2. The containment setting menu allows a user to select a criteria for including objects into logical containers in a useful manner. The use of the containment setting interface and the criteria utilized for including objects into various logical containers will subsequently be described in greater detail.

The configuration of filing cabinet 200 and each of drawers 202 and 204 in FIG. 2 illustrates the utility and intuitive nature provided by the configuration of the present invention. For example, objects that are physically stored in disk drives, servers, databases, partitions, a disk drive, and selected portions of a storage space may be easily organized in a drawer in filing cabinet 200, while not requiring the user to be constricted to a data structure within data processing system 100. Operation of data processing system 100 of the present invention will subsequently be described in greater detail.

Figure 3A:
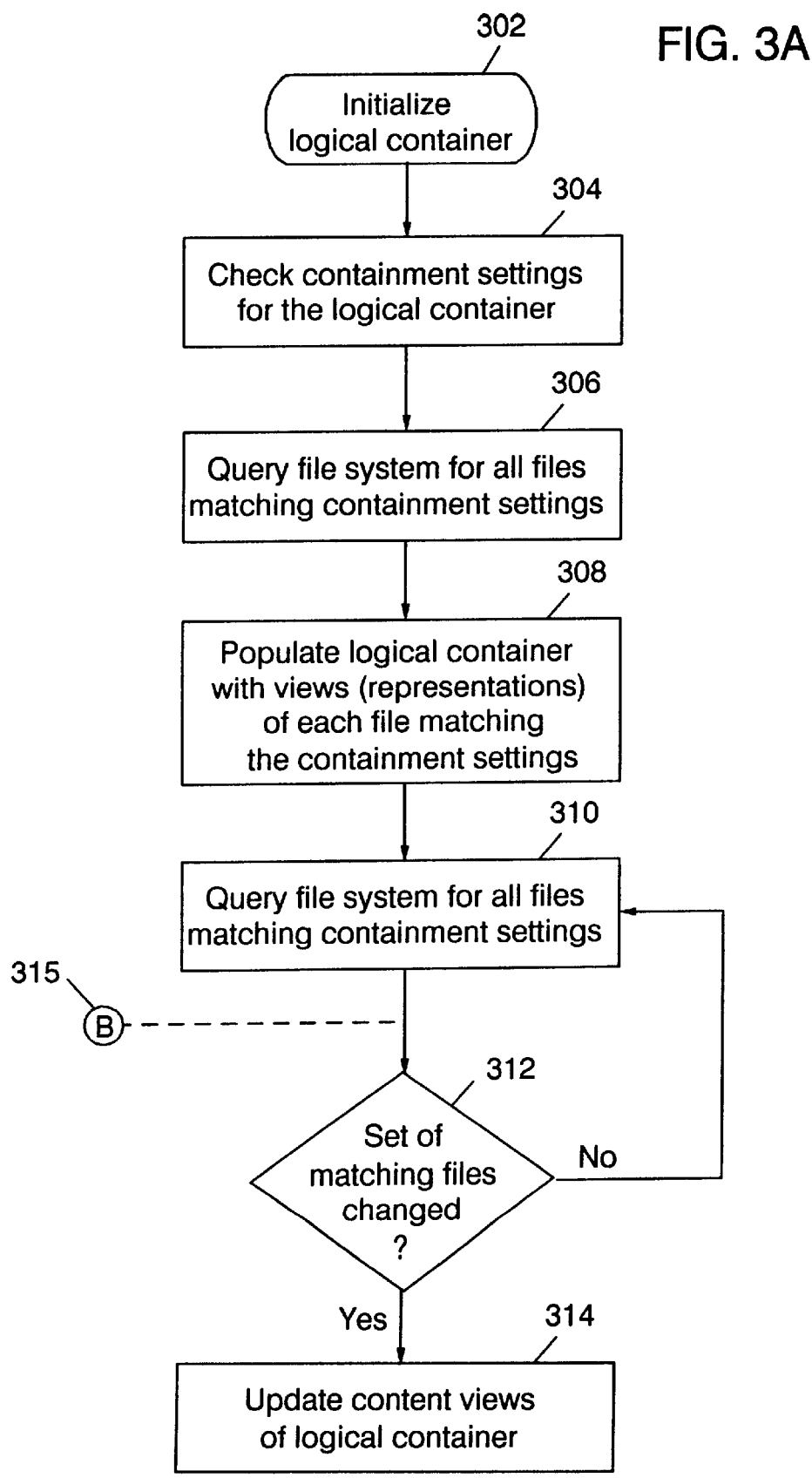
FIG. 3-A illustrates, in flow diagram form, a methodology for displaying an object in a display device in accordance with one embodiment of the present invention.

FIG. 3-A illustrates a flow chart which is implemented by the data processing system software of the present invention. To implement the methodology of the present invention described herein, CPU 110 executes the following steps to display a logical container as a filing cabinet 200 on display device 138. In step 302, control signals indicating that a logical container is to be rendered on display device 138 are provided to CPU 110. Such control signals may be provided by the data processing system software of the present invention. Subsequently, in response to control signals provided by CPU 110, CPU 110 accesses "containment settings" information associated with the logical container in a step 304. The "containment settings" information was previously configured by a designer, a system administrator, or an external user through the use of a graphical user interface which allowed the specification of the criteria for the objects to be stored within the logical container.

Next, in a step 306, CPU 110 queries an entire file system of data processing system 100 and, perhaps external networks via communications adapter 134, to identify all files matching the desired characteristics set in the containment settings interface. The set of all objects matching the query is thus identified as the contents of the logical container. Subsequently, whenever the logical container displays its contents, CPU 110 provides the proper control signals for generating views, or representations, of each file matching the containment settings. When such representations are generated, it should be noted that the matching file is not replicated. Rather, the representation is associated with the matching file and the physical location where the file is actually stored. Subsequently, in step 308, CPU 110 provides control signals to render the logical container on display device 138. In response to these control signals, data representing the logical container and the representations stored therein is provided to display adapter 136 and display adapter 136 transforms the data to enable display device 138 to display the logical container. The ability to take such control signals and display a graphical user interface in response thereto is well-known in the data processing art and will not be described in further detail herein.

After the logical container has been displayed on display device 138, CPU 110 continues to query the file system for all files matching the containment settings in a step 310. If the set of matching files remains unchanged, CPU 110 continues to query the file system for matching files. However, if the set of matching files is modified, CPU 110 retrieves information regarding the modified files, generates modified representations or views for each file matching the containment settings, and provides the appropriate control signals to display adapter 136 to display a modified logical container on display device 138 (step 314).

As illustrated in FIG. 3-A, several types of operations may be executed to modify a set of the files matching the containment settings. A placement of these steps is indicated by step 315. FIGS. 3-B-1 through 3-B-5 provide greater clarification as to the types of operations which may be executed to modify the set of matching files.

FIG. 3-B-1 illustrates a first methodology which may modify a set of files in a logical container. In FIG. 3-B-1, CPU 110 determines whether control signals are received that modify the containment settings indicating the objects to be displayed in the logical container. As previously mentioned, the containment settings may be configured in response to user inputs. Such settings indicate an object type or types which should be contained by an associated logical container. If the control signals received by CPU 110 indicate that the containment settings for display of the logical container should be modified, a program flow returns to step 304 of FIG. 3-A. Subsequently, CPU executes steps 306–314 to effectively update the contents of the logical container to reflect the modified files which correspond to the modified containment settings.

FIG. 3-B-2 illustrates another methodology which a user may perform to modify a set of files which match the original containment settings. In the methodology illustrated in FIG. 3-B-2, assume an external user performs an action on a contained object. CPU 110 next determines whether control signals are received which indicate that an object contained within the logical container has been accessed. CPU 110 processes the control signals to perform an action desired by the user. The action may include moving the object, copying the object, and editing the objects name, among others. When such control signals are received, CPU 110 and a remaining portion of data processing system 100 process the control signals to perform a designated operation. Subsequently, the program flow is returned to step 310 of FIG. 3-A. From there, CPU 110 again queries the file system for all files matching the containment settings and subsequently updates the contents views within the display logical container.

FIG. 3-B-3 provides another methodology for modifying a set of matching files. In this methodology, CPU 110 determines whether files within the filing system have been modified. CPU 110 performs this function by querying the file system for updates. When any files in the file system have been changed, a program flow returns to step 310, where CPU 110 queries the file system for all files matching the current containment settings. Each of steps 310–314 is subsequently executed.

In another alternative methodology for modifying a set of matching files, CPU 110 determines whether the control signals which indicate whether a general data processing function should be received. Such general data processing functions include moving objects, copying objects, and editing objects, among others. When such control signals are received, CPU 110 and a remaining portion of data processing system 100 process the control signals to perform a designated operation. If the operation is processed, a program flow returns to step 310 where CPU 110 executes a query operation for determining whether any files in the file system match the containment settings.

FIG. 3-B-5 illustrates yet another methodology which may be executed for modifying the set of matching files generated in steps 302–314. CPU 110 next determines whether the logical container display has been ended. When the display has been "ended," CPU 110 provides control information to display device 138 to close the filing cabinet metaphor displayed thereon.

Thus, the methodology of the present invention effectively and intuitively displays a storage space of a data processing system to an end-user and allows the end-user to create a filing system which has an easily usable interface. By allowing a user to request that objects within an entire file system be placed in a logical container and allowing the user to set the parameters for defining the desired characteristics of each of the objects stored within the logical container, the present invention allows a user to organize representations of desired objects in various storage locations without requiring either extra steps by a user or excess memory. Furthermore, the ability of the present invention to update the information stored within a logical container dynamically and in real-time ensures that the filed information is current and accurate. The ability of a user to modify the containment settings and to have such modifications immediately reflected in the logical container rendered on display device 138 allows a user great flexibility in obtaining a desired graphical user interface. An example utilizing the methodology of the present invention will be illustrated and described below.

The example provided below will utilize specific examples of types of objects and their evaluation within data processing system 100 of the present invention. However, it should be well understood to those skilled in the art that additional objects having different properties may be utilized in the context of the present invention. With this stated, refer to FIG. 4 where a user has created a memo on data processing system 100. The memo displayed on display device 138 is addressed to "Shirley Martin" and was created on a date of Jun. 5, 1995. After this memo is created and saved, CPU 110 parses the contents of the memo to determine that the document type is a "memo", a date on which the memo was created was Jun. 5, 1995, and the contents of the letter are addressed to a person named "Shirley Martin".

In a next step of this example, the user accesses a containment settings page of a properties notebook for a logical container. Such properties notebooks are often implemented for objects in operation systems such as OS/2 and Windows. When the containment settings page is accessed, this page provides choices for a user to select criteria specifying which object types are to be contained by the logical container. In this example, assume that the containment settings page 500 (FIG. 5) is associated with drawer 204 of filing cabinet 200. As is illustrated in FIG. 5, the user has selected to include all objects classified as memos in drawer 204 of filing cabinet 200. It should be known to those with skill in the relevant art that additional information may also be displayed on containment settings page 500 and selected by a user in a manner similar to that disclosed herein.

After the user determines the type of objects which should be contained in drawer 204, CPU 110 of data processing system 100 queries the file system for all files matching the containment settings set forth in containment settings page 500. The querying function executed by CPU 110 is well-known to those with skill in the data processing art and will not be described in further detail herein.

After querying the file system for all files matching the containment settings, the set of all objects matching the query is identified as the contents of the logical container. Subsequently, whenever the logical container displays its contents, CPU 110 generates views, or representations, for each file matching the containment settings. That is, CPU 110 provides a pointer or a reference to the file locations and generates representations for each. Thus, if the memo illustrated in FIG. 4 is stored in ROM 116, CPU 110 will create a representation of that memo which has a pointer to ROM 116. The representation will be displayed on display device 138. This step is illustrated in FIG. 6. In FIG. 6, drawer 204 represents a logical container, as does a folder 206, labeled "Memo To Shirley Martin-6/5/95." Thus, the memo written by the user (and illustrated in FIG. 4) is stored within drawer 204 when the containment settings indicates that objects classified as a memo should be placed therein. Additionally, objects classified as memos in ROM 116, disk drive 120, storage space 140, and a remaining portion of a network which may be accessed through communications adapter 134 will be stored in memo folder 206 automatically. All of the files having an object classification as a memo will then be displayed within memory folder 206.

Next, assume that a user modifies a containment settings page illustrated in FIG. 5 to indicate that they want to view all documents created "today." To perform this function, a user would be required to select a date setting of "today" on containment settings page 500 of FIG. 5. Subsequently, CPU 110 queries the file system of data processing system 100 for all files matching the modified containment settings. If today's date is Jun. 5, 1995, then the memo created by the user and illustrated in FIG. 4 will be identified as a matching file. After querying the file system for all objects matching the query is identified as the contents of the logical container. Subsequently, whenever the logical container displays its contents, CPU 110 generates views, or representations, for each file matching the containment settings. Additionally, CPU 110 generates a representation of this memo and stores it within drawer 204. Therefore, all memos created "today" will remain within drawer 204, and all memos not created "today" will be removed from drawer 204. In the example illustrated in FIG. 7, only the folder labeled "Memo To Shirley Martin-6/5/95" matches the desired containment settings for drawer 204 and, therefore, will remain in drawer 204. Alternatively, the folder labeled "Memo To Joe Smith-6/3/95" was not created "today" and does not match the desired containment settings for drawer 204. Thus, the folder labeled "Memo To Joe Smith-6/3/95" will be removed from drawer 204. After rendering file cabinet 200 and drawer 204 on display device 138, CPU 110 continues to query the file system for all files matching the containment settings. If the properties associated with the set of matching files or with other files within a filing system are modified, CPU updates the content views of drawer 204.

FIGS. 4–7 are provided as an example of operation of the present invention. However, it should be understood that the present invention may be applied to detect many different types of properties of objects utilized within a data processing system and is not limited to those disclosed herein. Stated another way, it should be understood that objects retain certain information about themselves which can be queried by a CPU, such as CPU 110 of data processing system 100. Some of the information comprises values which are defined implicitly (e.g., date of creation, part type) and others are defined explicitly (e.g., name). Furthermore, some values are fixed (e.g., date of creation) and other values are modifiable (e.g., name, associations).

Figure 8:
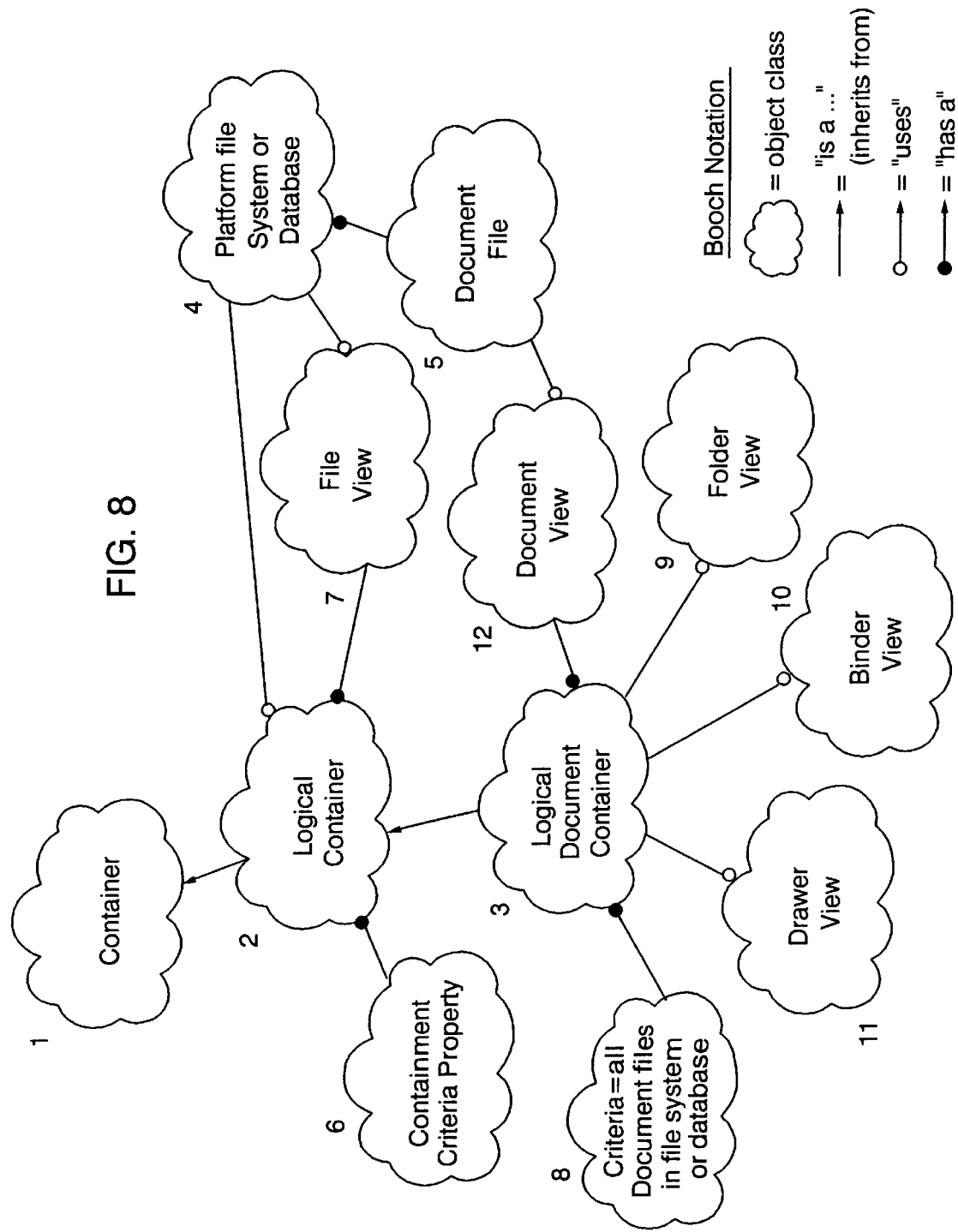
FIG. 8 illustrates, in Booch notation, a model of a data processing system in accordance with one embodiment of the present invention.

Lastly, a model of the system for logical containment implemented by the present invention is illustrated with Booch notation in FIG. 8. FIG. 8 may be explained as follows: a logical container (2) is a container (1), and therefore inherits the ability to hold a collection of objects and, more specifically, a collection of views of objects. A logical container (2) has a property (6) which describes the set of objects to be contained. The container (2) contains a view of each object which is part of that set (7). As an example, consider a logical document container (3), which is a logical container (2), and has a property (8) which specifies that (3) contains all document files (5). The logical document container (3) then contains views (12) of all document files (5). This logical document container is an object itself, and may be represented by one or more views, such as a folder, binder, or drawer (9, 10, 11).

As previously mentioned, the methodology of the present invention effectively and intuitively displays a storage space of a data processing system to an end-user and allows the end-user to create a filing system which has an easily usable interface. The present invention allows a user to request a type of object throughout an entire file system to be placed in a logical container. By allowing the user to set parameters for defining desired characteristics of each of the objects stored within the logical container, the present invention allows a user to organize representations of desired objects in various storage locations without requiring other extra steps by a user or excess memory. Furthermore, the present invention provides the ability to update the information stored within a logical container dynamically and in real-time. This ability ensures that the filed information is current and accurate. Furthermore, the ability of a user to modify the containment settings and to have such modifications immediately reflected in the logical container rendered on display device 138 allows a user great flexibility in obtaining a desired graphical user interface.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:
   a user interface for receiving a first plurality of control signals indicating a first object type;
   a memory system for storing a plurality of stored objects;
   a central processing unit coupled to the user interface for receiving the first plurality of control signals and coupled to the memory system the central processing unit querying the memory system to identify a first portion of the plurality of stored objects which are the first object type in response to the first plurality of control signals, the central processing unit generating a first plurality of representations of the first portion of the plurality of stored, objects and the central processing unit providing a second plurality of control signals corresponding to the first plurality of representations; and
   a display device for displaying a first object in response to the second plurality of control signals, wherein the first object stores the first plurality of representations of the first portion of the plurality of stored objects.

2. The data processing system of claim 1 wherein the central processing unit updates the first plurality of representations of the first portion of the plurality of stored objects when a first action is performed to modify the first portion of the plurality of stored objects of the first object type.

3. The data processing system of claim 2 wherein the first action comprises one of:
   i. an action to generate a first one of the plurality of stored objects of the first object type; and
   ii. an action to modify a first one of the first portion of the plurality of stored objects to be a second object type.

4. The data processing system of claim 1 wherein the user interface receives a second plurality of control signals indicating a second object type.

5. The data processing system of claim 4 wherein the central processing unit queries the memory system to identify the first portion of the plurality of stored objects which are both the second object type and the first object type.

6. The data processing system of claim 4 wherein,
   the central processing unit queries the memory system to identify a second portion of the plurality of stored objects which are both the first object type and the second object type,
   the central processing unit generates a second plurality of representations of the second portion of the plurality of stored objects, wherein the second plurality of representations is a subset of the first plurality of representations, and
   a second object stores the second plurality of representations of the second portion of the plurality of stored objects.

7. The data processing system of claim 6 wherein, the display device displays the first object in response to the second plurality of control signals, and wherein the display device displays the second object in response to a fourth plurality of control signals.

8. A method for operating a data processing system, comprising the steps of:
   utilizing a user interface for receiving a first plurality of control signals indicating a first object type;
   utilizing a memory system for storing a plurality of stored objects;
   utilizing a central processing unit coupled to the user interface for receiving the first plurality of control signals and coupled to the memory system, the central processing unit querying the memory system to identify a first portion of the plurality of stored objects which are the first object type in response to the first plurality of control signals, the central processing unit generating a first plurality of representations of the first portion of the plurality of stored objects, and the central processing unit providing a second plurality of control signals corresponding to the first plurality of representations; and
   utilizing a display device for displaying a first object in response to the second plurality of control signals, wherein the first object stores the first plurality of representations of the first portion of the plurality of stored objects.

9. The method of claim 8 wherein the central processing unit updates the first plurality of representations of the first portion of the plurality of stored objects when a first action is performed to modify the first portion of the plurality of stored objects of the first object type.

10. The method of claim 9 wherein the first action comprises one of:
    i. an action to generate a first one of the plurality of stored objects of the first object type; and
    ii. an action to modify a first one of the first portion of the plurality of stored objects to be a second object type.

11. The method of claim 8 wherein the user interface receives a third plurality of control signals indicating a second object type.

12. The method of claim 11 wherein the central processing unit queries the memory system to identify the first portion of the plurality of stored objects which are both the second object type and the first object type.

13. The method of claim 11 wherein the central processing unit queries the memory system to identify a second portion of the plurality of stored objects which are both the first object type and the second object type,
    wherein the central processing unit generates a second plurality of representations of the second portion of the plurality of stored objects, wherein the second plurality of representations is a subset of the first plurality of representations, and
    wherein a second object stores the second plurality of representations of the second portion of the plurality of stored objects.

14. The method of claim 13 wherein the display device displays the first object in response to the second plurality of control signals, and wherein the display device displays the second object in response to a fourth plurality of control signals.

15. A program storage device readable by a machine, tangibly embodying a program of instructions executable by the machine to perform method steps for simulating an object in a data processing system, said method steps comprising:
    utilizing a user interface for receiving a first plurality of control signals indicating a first object type;
    utilizing a memory system for storing a plurality of stored objects;
    utilizing a central processing unit coupled to the user interface for receiving the first plurality of control signals and coupled to the memory system, the central processing unit querying the memory system to identify a first portion of the plurality of stored objects which are the first object type in response to the first plurality of control signals, the central processing unit generating a first plurality of representations of the first portion of the plurality of stored objects, and the central processing unit providing a second plurality of control signals corresponding to the first plurality of representations; and
    utilizing a display device for displaying a first object in response to the second plurality of control signals, wherein the first object stores the first plurality of representations of the first portion of the plurality of stored objects.

16. The program storage device of claim 15 wherein the central processing unit updates the first plurality of representations of the first portion of the plurality of stored objects when a first action is performed to modify the first portion of the plurality of stored objects of the first object type.

17. The program storage device of claim 16 wherein the first action comprises one of:
    i. an action to generate a first one of the plurality of stored objects of the first object type; and
    ii. an action to modify a first one of the first portion of the plurality of stored objects to be a second object type.

18. The program storage device of claim 15 wherein the user interface receives a third plurality of control signals indicating a second object type.

19. The program storage device of claim 18 wherein the central processing unit queries the memory system to identify the first portion of the plurality of stored objects which are both the second object type and the first object type.

20. The program storage device of claim 18 wherein the central processing unit queries the memory system to identify a second portion of the plurality of stored objects which are both the first object type and the second object type, wherein the central processing unit generates a second plurality of representations of the second portion of the plurality of stored objects, wherein the second plurality of representations is a subset of the first plurality of representations, and wherein a second object stores the second plurality of representations of the second portion of the plurality of stored objects.

21. The program storage device of claim 20 wherein the display device displays the first object in response to the second plurality of control signals, and wherein the display device displays the second object in response to a fourth plurality of control signals.

* * * * *

UNITED STATES PATENT AND TRADEMARK OFFICE
CERTIFICATE OF CORRECTION

PATENT NO. : 5,936,624
DATED : August 10, 1999
INVENTOR(S) : Lisle et al.

It is certified that error appears in the above-identified patent and that said Letters Patent is hereby corrected as shown below:

Column 12, line 57, after "plurality of stored" delete [,];
Column 12, line 57 after "of stored objects" insert , ; and
Column 13, Line 12 after "interface receives a" delete [second] and insert third .

Signed and Sealed this

Twelfth Day of December, 2000

Attest:

Q. TODD DICKINSON

Attesting Officer

Director of Patents and Trademarks